(12) United States Patent
Mikuriya et al.

(10) Patent No.: US 7,400,446 B2
(45) Date of Patent: Jul. 15, 2008

(54) CONFOCAL MICROSCOPE

(75) Inventors: Kenta Mikuriya, Tokyo (JP); Takashi Yoshida, Tokyo (JP); Takayuki Kei, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 11/362,228

(22) Filed: Feb. 27, 2006

(65) Prior Publication Data

US 2006/0209399 A1  Sep. 21, 2006

(30) Foreign Application Priority Data

Feb. 28, 2005  (JP) .................... P.2005-052320

(51) Int. Cl.
*G02B 21/06* (2006.01)
(52) U.S. Cl. .................. 359/385; 359/368; 359/279
(58) Field of Classification Search ............. 359/385
See application file for complete search history.

(56) References Cited

U.S. PATENT DOCUMENTS 5,587,832 A * 12/1996 Krause ................ 359/385
6,778,323 B2 * 8/2004 Endo et al. ............... 359/383
2001/0042837 A1 * 11/2001 Hoffmann ............... 250/458.1
2004/0032650 A1 * 2/2004 Lauer .................... 359/385
2004/0262534 A1 * 12/2004 MacAulay et al. ...... 250/458.1
2006/0012872 A1 * 1/2006 Hayashi et al. ........... 359/386

FOREIGN PATENT DOCUMENTS

JP  5-60980 A  3/1993

* cited by examiner

*Primary Examiner*—Stephone B. Allen
*Assistant Examiner*—Lee Fineman
(74) *Attorney, Agent, or Firm*—Sughrue Mion, PLLC

(57) ABSTRACT

A confocal microscope uses fluorescent or reflected light obtained by irradiating a plurality of beam spots to a sample so as to observe the sample. The confocal microscope has a phase modulator element which modulates phase of laser light to form the beam spots, a liquid crystal element which forms a plurality of pinholes through which only the fluorescent or the reflected light is transmitted, and a control section which controls the phase modulator element and the liquid crystal element.

9 Claims, 2 Drawing Sheets

CONFOCAL MICROSCOPE

CROSS-REFERENCE TO RELATED APPLICATIONS

This application is based upon and claims the benefit of priority from the prior Japanese Patent Applications No. 2005-052320, filed on Feb. 28, 2005, the entire contents of which are incorporated herein by reference.

BACKGROUND OF THE INVENTION

1. Field of the Invention

The present invention relates to a confocal microscope, more particularly to a confocal microscope which enables to programmably vary the number of illumination spots and the pinhole sizes.

2. Description of the Related Art

A confocal microscope is used to observe a sample by scanning an optical spot focused onto the sample and bringing fluorescent light or reflected light emanating from the sample into a focus to obtain an image. Confocal microscopes are used for observation of physiological reactions in living cells in the biological and biotechnological fields, observation of morphologies, and observation of surfaces of LSIs in the semiconductor industry.

FIG. 2 is a diagram showing a related art confocal microscope.

In FIG. 2, a confocal scanner 110 is connected with an aperture 122 of the microscope 120. Laser light 111 is collected into individual light beams by microlenses 117 in a microlens array disk 112. After passage through a dichroic mirror 113, the beams are transmitted through individual pinholes 116 in a pinhole array disk 114 (hereinafter, referred to as "Nipkow disk") and are collected onto a sample 140 on a stage 123 by an objective lens 121 equipped to the microscope 120.

A fluorescent signal emanating from the sample 140 again passes through the objective lens 121 and is collected onto the individual pinholes in the Nipkow disk 114. The beams of the fluorescent signal passed through the individual pinholes are emitted from the confocal scanner 110 such that the beams are reflected by the dichroic mirror 113 and that the beams are collected onto an image sensor 131 via a relay lens 115. In this confocal microscope, the Nipkow disk 114 is rotated at a constant speed by a motor (not shown). Movement of the pinholes 116 caused by the rotation scans the focal points on the sample 140.

Since the plane at which the pinholes of the Nipkow disk 114 are arrayed, the surface of the sample 140 to be observed, and the photosensitive surface of the image sensor 131 are placed in an optically conjugate relationship, an optically sectioned image of the sample 140 (i.e., confocal image) is collected onto the image sensor 131 (see, for example, JP-A-5-60980).

JP-A-5-60980 is referred to as a related art.

In such a confocal microscope, there are about 1,000 pinholes within the field of view. It follows that 1,000 beams are illuminated simultaneously.

Only with this configuration, however, only information about multiple points is derived. Therefore, it is necessary to scan the laser beams in order to accept an image, i.e., planar information. Consequently, a two-dimensional image is constructed in 1 msec (at the highest speed) by rotating a Nipkow disk equipped with microlenses and raster-scanning a plurality of beams.

The related art confocal microscope described above uses the multi-beam scanning technique relying on individual pinholes in a Nipkow disk. In this Nipkow disk, the pinhole sizes are fixed. The illuminating light has a Gaussian distribution obtained by collimating diffused laser light. In principle, the light intensity is not uniform between the center and surrounding portions of the illuminating light. Rather, shading has occurred. Furthermore, the area of the Nipkow disk limits the number of beams hitting the sample and so there is the problem that the field of view is narrowed.

SUMMARY OF THE INVENTION

An object of the invention is to provide a confocal microscope which enables to programmably vary the number of illumination spots and pinhole sizes, and which shows very high flexibility in a multi-beam scanning technique.

The present invention provides confocal microscopes constructed as follows.

The invention provides a confocal microscope for using the resultant fluorescent or reflected light obtained by irradiating a plurality of beam spots to a sample so as to observe the sample, having: a phase modulator element which modulates phase of laser light to form the plurality beam spots; a liquid crystal element which forms a plurality of pinholes through which only the fluorescent or the reflected light is transmitted; and a control section which controls the phase modulator element and the liquid crystal element.

In the confocal microscope, the phase modulator element varies at least one of diameter and position of each of the plurality of beam spots.

In the confocal microscope, the liquid crystal element varies at least one of diameter and position of each of the plurality of pinholes.

In the confocal microscope, the control section controls the phase modulator element and the liquid crystal element so as to synchronize displacement of the plurality of beam spots and displacement of the plurality of pinholes.

According to the confocal microscope, the following advantages are derived.

According to the confocal microscope, a pattern of beam spots is shaped by the phase modulator element. Therefore, an efficiency of collection of light comparable to that of a lens can be accomplished. Furthermore, the spot sizes and beam hit positions can be varied programmably. In addition, the sizes and positions of the pinholes can be changed programmably by a transmissive LCD. Further, shading can be corrected easily because the intensity of each beam spot that is exciting light can also be varied programmably. Additionally, the illuminated area can be enlarged, achieving a wider field of view.

Furthermore, the illuminating beam spots formed by the phase modulator element and the pinholes formed by the transmissive LCD are aligned in software. Multi-beam scanning can be attained without any driving mechanism.

DETAILED DESCRIPTION OF THE PREFERRED EMBODIMENTS

Figure 1:
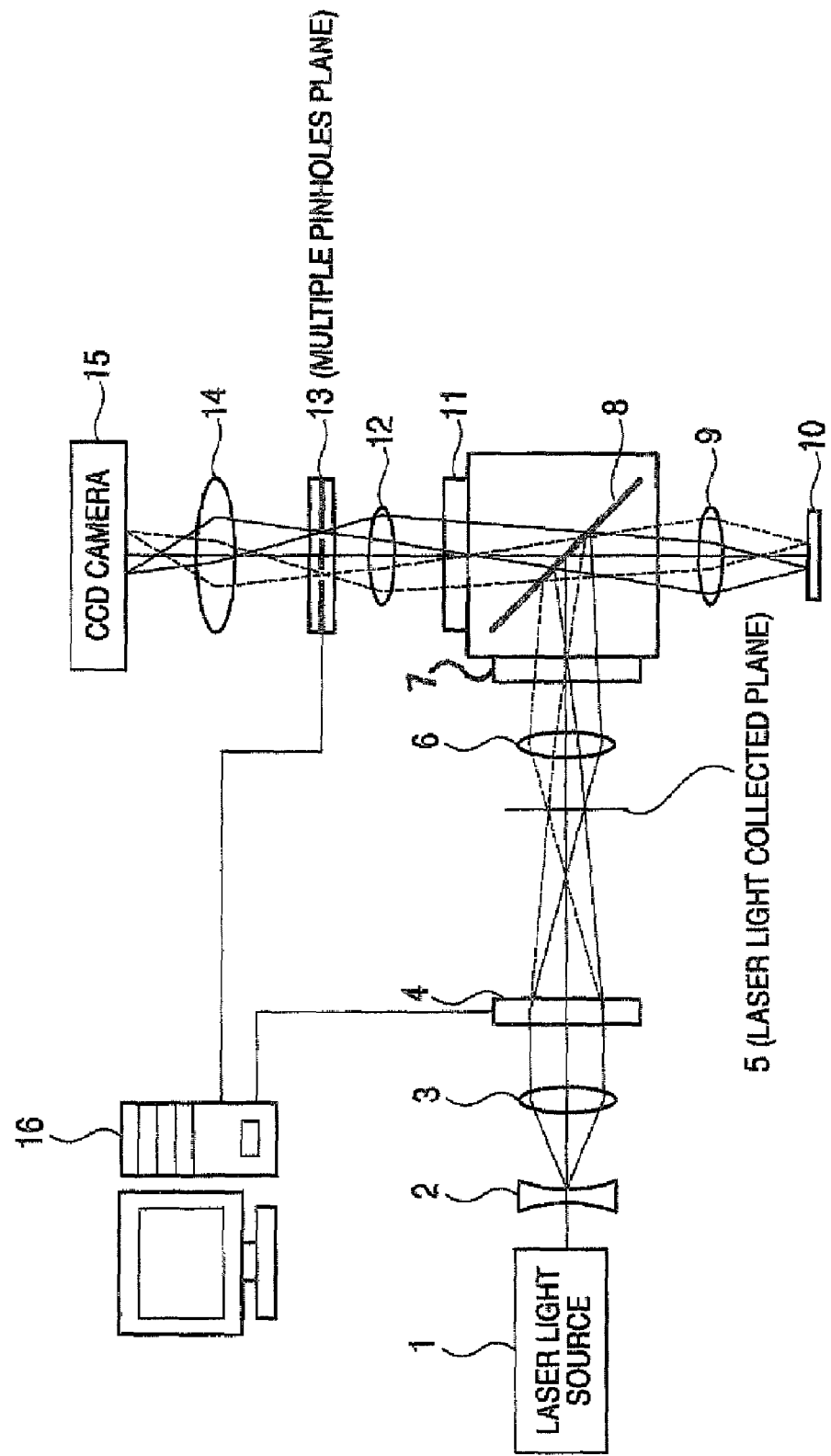
FIG. 1 is a diagram showing an embodiment of a confocal microscope according to the present invention.
Figure 2:
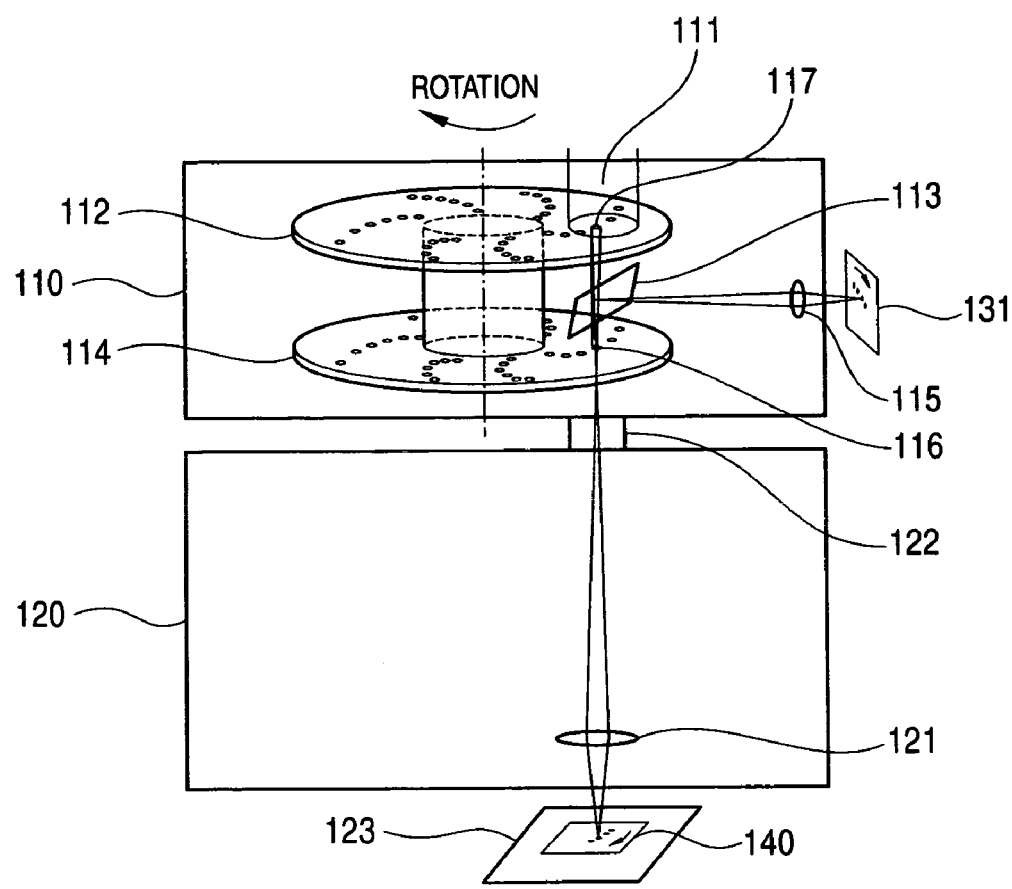
FIG. 2 is a diagram showing a related art confocal microscope.

An embodiment of the present invention is hereinafter described in detail with reference to the drawings. FIG. 1 is a diagram showing an embodiment of a confocal microscope according to the present invention.

In FIG. 1, a laser light source 1 emits laser light that constitutes exciting light directed at a sample 10. A concave lens 2 and a collimator lens 3 collimate the laser light from the laser light source 1. A phase modulator element 4 phase-modulates the collimated laser light and collects it as a plurality of spotlights onto a plane 5 scanned with multiple laser beams (a laser light collected plane). Thus, a pattern of multiple beam spots is formed. In particular, the phase modulator element 4 comprises a liquid crystal element, for example. Each cell modulates the phase of incident light by voltage control, yielding an efficiency of collection of light comparable to that of a lens. Also, an arbitrary pattern of optical image is collected. In the present embodiment, the pattern of multiple beam spots at the beam collected surface is Fourier-transformed by a controlling personal computer (PC) 16. In the phase modulator element 4, the Fourier-transformed pattern is formed. Thus, the laser light passed through the phase modulator element forms a pattern of multiple beam spots at the laser beam-collected surface.

This pattern of multiple beam spots is transmitted to a dichroic mirror 8 via a focusing lens 6 and via an EX filter 7 that cuts off wavelengths of the light excluding the wavelength of the exciting light. The pattern is then reflected by the dichroic mirror 8, impinges on the microscope, and reaches an objective lens 9, which in turn focuses the pattern of spots onto the sample.

Light returning from the sample 10 (spot images of fluorescent light) passes through the objective lens 9 and then through the dichroic mirror 8, whereby the light is separated from the exciting light. A BA filter 11 cuts off the wavelengths of light excluding the wavelength of the fluorescent light from the fluorescent light transmitted through the dichroic mirror 8. A focusing lens 12 focuses the images of spots of the fluorescent light transmitted through the BA filter 11 onto the plane of multiple pinholes (multiple pinholes plane) formed by a transmissive LCD (liquid crystal display) 13. A relay lens 14 focuses the images of fluorescent spots at the plane of multiple pinholes onto the photosensitive surface of a CCD (charge-coupled device) camera 15.

The pinholes on the observer side are varied programmably by controllably turning on and off the light using the cells of the transmissive LCD 13. Consequently, a pattern of multiple pinholes is formed. This pattern of multiple pinholes is similar to the above-described pattern of multiple beam spots, is converted into data by the controlling PC 16, and sent to the transmissive LCD 13. Scanning of the multiple beams is done by varying the pattern of the phase modulator element 4. The pattern of pinholes of the transmissive LCD 13 varies in synchronism with the pattern of the modulator element 4, forming a two-dimensional image. This 2D image is converted into numerical data by the CCD camera 15.

The portion from the concave lens 2 to the dichroic mirror 8 and the portion from the BA filter 11 to the relay lens 14 constitute a confocal scanner, which in turn is attached to an optical microscope.

One example of a measurement sequence of the present invention is given below. The sequence is controlled by the controlling personal computer 16.

(1) A pattern of multiple pinholes is preset into the controlling personal computer.

(2) The pattern of multiple pinholes is Fourier-transformed.

(3) The amount of displacement of the pattern of multiple pinholes is set.

(4) A pattern shifted from the pattern of multiple pinholes by the amount of displacement (3) is formed.

(5) The pattern of (4) is Fourier-transformed.

(6) The pattern of multiple pinholes and data obtained by Fourier-transforming the pattern (hereinafter referred to as the Fourier transform data) are stored.

(7) A measurement is started.

(8) The Fourier transform data about the pattern of multiple pinholes is sent to the phase modulator element.

(9) Data about the pattern of multiple pinholes is sent to the transmissive LCD.

(10) Exposure of the camera is started.

(11) Fourier transform data about the pattern of multiple pinholes and the data about the pattern of multiple pinholes are switched while synchronizing them.

(12) Exposure of the camera ends.

As described so far, the pattern of spots is shaped by the phase modulator element. Therefore, an efficiency of collection of light similar to that of a lens can be accomplished. In addition, the spot sizes and beam hit positions can be varied programmably. Furthermore, the sizes and positions of the pinholes can be varied programmably by the transmissive LCD. Additionally, the intensity of the beams of exciting light can be varied programmably. Hence, shading can be corrected easily. Additionally, the illuminated area can be enlarged. This can achieve a wider field of view. Moreover, the illumination spots and pinholes can be aligned in software.

In consequence, a confocal microscope utilizing a multi-beam scanning technique quite flexibly can be offered.

It is to be understood that the present invention is not limited to the foregoing embodiment but embraces many other alterations and variations that do not depart from the gist of the invention.

FIG. 1
1: LASER LIGHT SOURCE
5: (LASER LIGHT COLLECTED PLANE)
13: (MULTIPLE PINHOLES PLANE)
15: CCD CAMERA

What is claimed is:

1. A confocal microscope for using resultant fluorescent or reflected light obtained by irradiating a plurality of beam spots to a sample so as to observe the sample, comprising:
   a phase modulator element which modulates a phase of laser light to form the plurality of beam spots;
   a liquid crystal element which forms a plurality of pinholes in a pattern, through which only the fluorescent or the reflected light is transmitted; and
   a control section which controls the phase modulator element and the liquid crystal element
   wherein the phase modulator changes a plane of laser light by spatially changing the phase of laser light according to a Fourier transformed pattern of the pattern of the liquid crystal element; and
   the liquid crystal element is operable to block at least a portion of a light path.

2. The confocal microscope according to claim 1, wherein the phase modulator element varies at least one of diameter and position of each of the plurality of beam spots.

3. The confocal microscope according to claim 2, wherein the liquid crystal element varies at least one of diameter and position of each of the plurality of pinholes.

4. The confocal microscope according to claim 3, wherein the control section controls the phase modulator element and the liquid crystal element so as to synchronize displacement of the plurality of beam spots and displacement of the plurality of pinholes.

5. The confocal microscope according to claim 1, wherein the liquid crystal element varies at least one of diameter and position of each of the plurality of pinholes.

6. The confocal microscope of claim 1, wherein the phase modulator comprises a second liquid crystal element, different from the liquid crystal element, which provides light collection functions to create beam spots.

7. The confocal microscope of claim 1, further comprising an imaging device spaced from the liquid crystal element.

8. The confocal microscope of claim 1, further comprising a lens disposed between an imaging device and the liquid crystal element.

9. The confocal microscope of claim 1, wherein:

the phase modulator element modulates laser light as a function of the Fourier transformed pattern of the pattern of the liquid crystal element; and the phase modulator comprises a second liquid crystal element, different from the liquid crystal element, which provides light collection functions to create beam spots.

* * * * *